United States Patent
Wögerbauer et al.

(10) Patent No.: US 10,365,091 B2
(45) Date of Patent: *Jul. 30, 2019

(54) ELECTRONIC ANGLE MEASURING DEVICE FOR A BENDING MACHINE FOR MEASURING THE BENDING ANGLE BETWEEN THE LIMBS OF A SHEET

(71) Applicant: KEBA AG, Linz (AT)

(72) Inventors: Johann Wögerbauer, Linz (AT); Andreas Wögerbauer, Linz (AT)

(73) Assignee: KEBA AG, Linz (AT)

( * ) Notice: Subject to any disclaimer, the term of this patent is extended or adjusted under 35 U.S.C. 154(b) by 0 days.

This patent is subject to a terminal disclaimer.

(21) Appl. No.: 15/577,732

(22) PCT Filed: May 25, 2016

(86) PCT No.: PCT/AT2016/050163
§ 371 (c)(1),
(2) Date: Nov. 28, 2017

(87) PCT Pub. No.: WO2016/187638
PCT Pub. Date: Dec. 1, 2016

(65) Prior Publication Data
US 2018/0128604 A1  May 10, 2018

(30) Foreign Application Priority Data

May 28, 2015 (AT) .................................. A 334/2015

(51) Int. Cl.
*B21D 5/00* (2006.01)
*B21D 5/02* (2006.01)
(Continued)

(52) U.S. Cl.
CPC .............. *G01B 11/26* (2013.01); *B21C 51/00* (2013.01); *B21D 5/006* (2013.01); *B21D 5/02* (2013.01);
(Continued)

(58) Field of Classification Search
CPC ................................ B21D 5/006; G01B 21/22
See application file for complete search history.

(56) References Cited

U.S. PATENT DOCUMENTS 4,564,765 A * 1/1986 Blaich ...................... B21D 5/02
250/559.37
5,148,693 A * 9/1992 Sartorio ............... B21D 5/0209
72/18.1
(Continued)

FOREIGN PATENT DOCUMENTS

| DE | 4312565 A1 | 10/1994 |
| JP | 2002-059217 A | 2/2002 |
| WO | 2004/090467 A1 | 10/2004 |

OTHER PUBLICATIONS

Espacenet English-language Abstract for JP2002-059217 A published Feb. 26, 2002.

(Continued)

*Primary Examiner* — Shawn Decenzo
(74) *Attorney, Agent, or Firm* — Tiajoloff & Kelly LLP

(57) ABSTRACT

An electronic angle measuring device for a bending machine for measuring the bending angle between the legs (4) of a sheet (5) using a sensor element (7) is described, which supplies angle-equivalent signals in a contactless manner to a signal processing unit (9), which has a microprocessor and a memory unit and is connected to a digital display (10). To provide simple measuring conditions, it is proposed that the sensor element (7), the signal processing unit (9), and the display (10) form an angle measuring device (6) which is fastenable on the upper tool (1) of the bending machine and
(Continued)

is usable as a handheld encoder, and which has a motion sensor (11), which is connected to the signal processing unit (9) and detects the lowering and/or raising movement of the upper tool (1), for triggering the measuring procedure.

7 Claims, 2 Drawing Sheets

(51) Int. Cl.
*B21C 51/00* (2006.01)
*G01B 11/26* (2006.01)
*G01B 21/04* (2006.01)
*G01B 21/22* (2006.01)

(52) U.S. Cl.
CPC ......... *B21D 5/0272* (2013.01); *G01B 21/047* (2013.01); *G01B 21/22* (2013.01); *G01B 2210/58* (2013.01)

(56) References Cited

U.S. PATENT DOCUMENTS

| | | | | |
|---|---|---|---|---|
| 5,291,264 | A * | 3/1994 | Longa | G01B 11/2755 |
| | | | | 356/139.09 |
| 5,488,470 | A * | 1/1996 | Ooenoki | B21D 5/0209 |
| | | | | 356/138 |
| 5,531,087 | A * | 7/1996 | Kitabayashi | B21D 5/02 |
| | | | | 72/31.01 |
| 5,864,391 | A * | 1/1999 | Hosokawa | G01S 7/4817 |
| | | | | 356/4.01 |
| 6,268,912 | B1 * | 7/2001 | Brinkman | B21D 5/02 |
| | | | | 356/138 |
| 6,386,008 | B1 * | 5/2002 | Virtanen | B21D 5/02 |
| | | | | 72/19.8 |
| 6,727,986 | B1 * | 4/2004 | Serruys | B21D 5/02 |
| | | | | 356/139.03 |
| 7,316,077 | B2 | 1/2008 | Fuge et al. | |
| 7,639,346 | B2 | 12/2009 | Booker, Jr. | |
| 9,134,339 | B2 | 9/2015 | Becker et al. | |
| 2003/0160974 | A1 * | 8/2003 | Demeyere | G01B 11/08 |
| | | | | 356/635 |
| 2007/0058155 | A1 | 3/2007 | Booker, Jr. | |
| 2007/0068024 | A1 | 3/2007 | Fuge et al. | |
| 2013/0176572 | A1 * | 7/2013 | Lim | G01B 9/02 |
| | | | | 356/479 |
| 2013/0181983 | A1 * | 7/2013 | Kitamura | G01B 11/24 |
| | | | | 345/419 |
| 2013/0289760 | A1 * | 10/2013 | Angerer | B21D 5/00 |
| | | | | 700/165 |
| 2013/0298624 | A1 * | 11/2013 | Sperrer | B21D 5/00 |
| | | | | 72/2 |
| 2015/0006074 | A1 * | 1/2015 | Le Scouarnec | G01C 21/165 |
| | | | | 701/468 |
| 2015/0055204 | A1 * | 2/2015 | Ichii | G02B 26/0841 |
| | | | | 359/214.1 |
| 2015/0085301 | A1 | 3/2015 | Becker et al. | |
| 2015/0160342 | A1 * | 6/2015 | Zweigle | G09B 29/004 |
| | | | | 356/5.01 |
| 2015/0212653 | A1 * | 7/2015 | Cable | G06F 3/0423 |
| | | | | 345/175 |
| 2015/0241208 | A1 * | 8/2015 | Lichtenberg | B21D 5/006 |
| | | | | 72/31.1 |
| 2016/0040973 | A1 * | 2/2016 | Gesuita | G01B 5/24 |
| | | | | 33/534 |
| 2016/0245918 | A1 | 8/2016 | Becker et al. | |

OTHER PUBLICATIONS

Espacenet English-language Abstract for DE 4312565 A1 published Oct. 20, 1994.

* cited by examiner

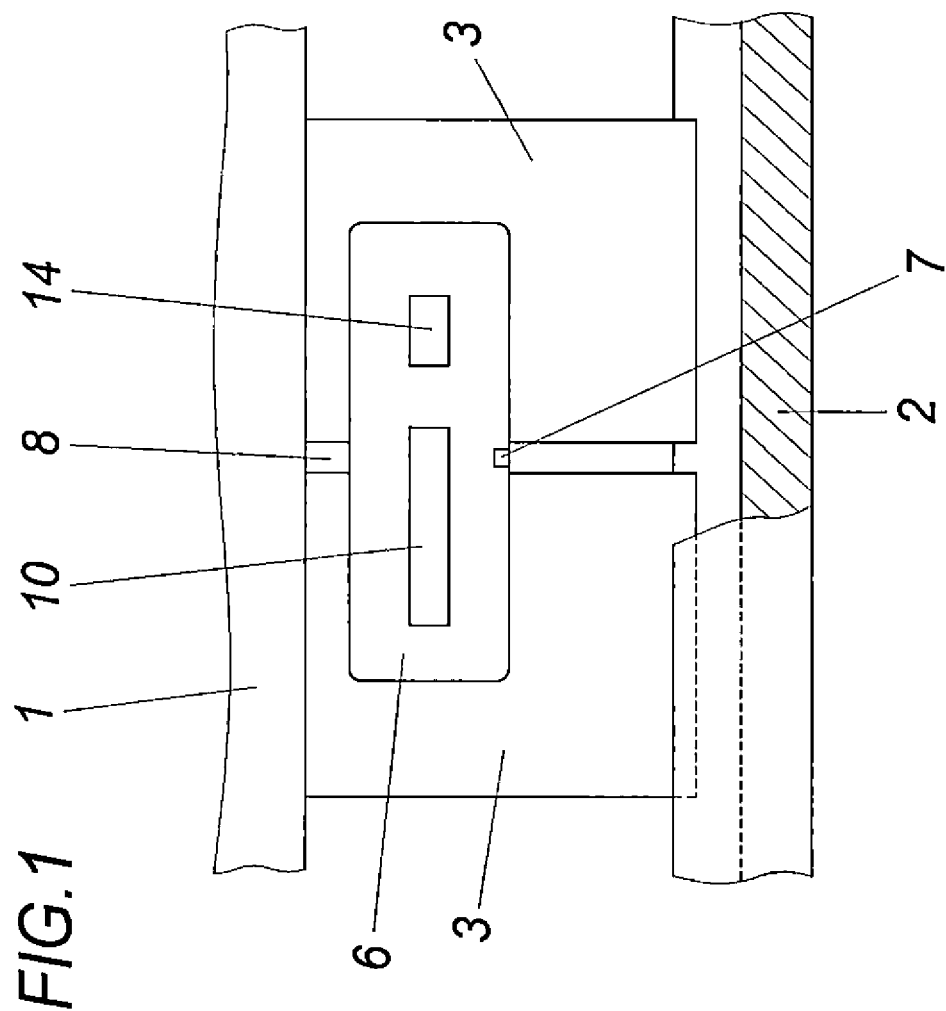
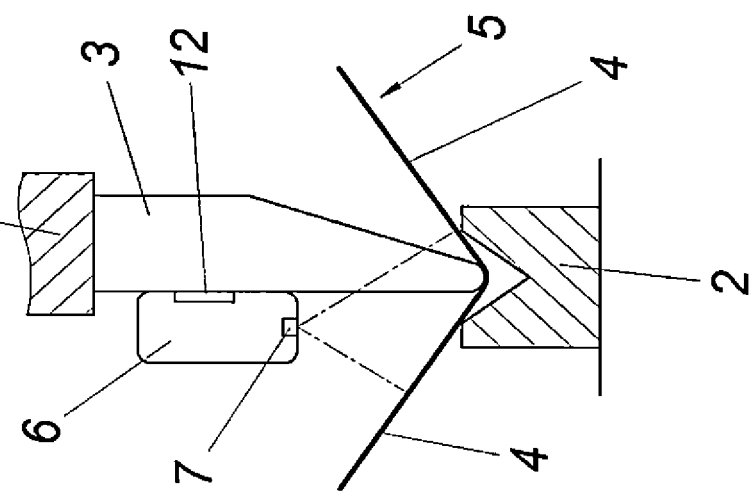

ELECTRONIC ANGLE MEASURING DEVICE FOR A BENDING MACHINE FOR MEASURING THE BENDING ANGLE BETWEEN THE LIMBS OF A SHEET

FIELD OF THE INVENTION

The invention relates to an electronic angle measuring device for a bending machine for measuring the bending angle between the legs of a sheet using a sensor element, which supplies angle-equivalent signals in a contactless manner to a signal processing unit, which has a microprocessor and a memory unit, and which is connected to a digital display.

DESCRIPTION OF THE PRIOR ART

The measurement of the bending angle in sheet bending is of substantial significance, since the workpiece rebounds after the bending process depending on the material, the thickness of the sheet, the rolling direction, and the like. With the use of an effective measuring device, the bending result can therefore be monitored while still in the machine and/or corrected and/or improved by a manual or automatic rebending procedure, without the workpiece having to be removed from the machine. This means that the angle measurements are to be carried out depending on the lowering and raising movement of the upper tool, which requires a control of the measuring device adapted to the control of the bending machine. The integration of such known measuring devices into a bending machine and the machine-dependent control thereof requires a complex adaptation of the bending machines by special designs, however.

For the contactless measurement of the bending angle between the legs of a sheet to be bent in a bending machine, measuring devices are known (DE 43 12 565 C2), which are based on a light intersection method. In addition, however, using measuring devices (JP 2002-59217 A) in which the circumstance is utilized that the radiation intensity of a laser beam reflected on a leg of the sheet and received in the emission direction is greatest when the laser beam is incident perpendicularly on the sheet leg is also known. For this purpose, a mirror is provided in the region of the upper tool of the bending machine, which rotates about an axis parallel to the vertex axis of the bending angle and is inclined at 45° in relation to this rotational axis, so that a laser beam incident on the mirror in the direction of the rotational axis is deflected in a plane perpendicular to the rotational axis on the leg of the sheet to be bent and is reflected by the legs, specifically in the emission direction if the laser beam is perpendicular to the respective leg. The respective angle between the two legs can then be ascertained in a signal processing unit via the associated rotational position of the drive motor for the mirror. The disadvantage for the use of such a measuring device, of having to adapt the design of the bending machine, remains, however.

SUMMARY OF THE INVENTION

The invention is therefore based on the object of providing simple structural conditions to be able to equip, even by retrofitting, a bending machine with an electronic angle measuring device for measuring the bending angle between the legs of a sheet, without having to perform complex refitting measures on the bending machine.

The invention achieves the stated object by way of the features of claim 1.

Since the measuring device is designed as an angle measuring device, which comprises the units necessary for the angle measurement, namely a sensor element, which supplies angle-equivalent signals in a contactless manner to a signal processing unit, which has a microprocessor and a memory unit, is connected to a digital display, and is also arranged in the angle measuring device, this angle measuring device only has to be fastened to the upper tool of the bending machine, which does not require complex design refitting of the bending machine. The upper tools of the bending machines are typically assembled from individual stamp segments, which interact with a matrix-like lower tool. For measuring access to the two legs of the sheet to be bent, it is therefore merely necessary to leave a measuring gap free between two stamp segments and to align the angle measuring device in relation to this measuring gap.

Since the angle measuring device has a motion sensor, which is connected to the signal processing unit and detects the lowering and/or raising movement of the upper tool, for triggering the measuring procedure, the angle measuring device can be operated independently of the machine controller. The movement of the upper tool is detected by the angle measuring device itself by way of the motion sensor, so that angle measurements can be carried out automatically in synchronization with the work cycles of the bending machine, without special provisions having to be taken for this purpose on the bending machine, for example, providing cables or interfaces to the machine controller for the exchange of synchronization signals. This applies to the use of the angle measuring device both as a machine encoder and also as a handheld encoder.

Particularly advantageous design conditions result if the motion sensor is designed as a multi-axis accelerometer, because in this case a simple alignment of the angle measuring device in relation to the vertex axis of the bending angle, which typically extends horizontally, is possible with the aid of the multi-axis accelerometer. The detection of the direction of gravity on the basis of an analysis of the acceleration signals by the signal processing unit can additionally be used for inclination detection and display of the inclination angle.

The detection of the acceleration of gravity by the multi-axis accelerometer additionally enables a correction of the signal of the accelerometer by the signal component based on the acceleration of gravity, so that exclusively motion changes of the angle measuring device and therefore the upper tool are detected. The velocity and the travel of the upper tool for the start and the end of the measuring procedure may therefore be ascertained from the corrected, offset-free acceleration values.

In relation to the direct analysis of the signal of the acceleration sensor, which is proportional to the acceleration, the use of the value of the velocity derived therefrom or of the distance traveled is advantageous because if the acceleration is merely observed, incorrect triggering can occur, as a result of strong shocks, as can occur on industrial bending machines. Vice versa, for example, in the case of electrically operated bending machines, the motion can be initiated with low acceleration, so that a threshold value which is merely established for the acceleration is not exceeded at all and therefore also no measuring procedure would be triggered. In the case of bending machines, however, at least during the displacement of the upper tool from the base position into the working position and during the resetting into the base position after the bending procedure, a sufficiently high velocity occurs to be able to synchronize the measuring and bending procedures reliably. It is to be noted in this context that angle measurements can advantageously be carried out when the bending procedure is completed or nearly completed, i.e., before or at the beginning of the raising movement of the upper tool.

The signal of the accelerometer can also be used to activate essential parts of the angle measuring device, in particular the sensor element, the display, and/or the microprocessor and/or to switch them from an energy saving rest mode into an active operating mode. The time of the power consumption is thus substantially reduced to the short movement phases of the upper tool in which the bending angle can actually be measured, whereby the required battery or rechargeable battery capacity and, accompanying this, the structural size of the angle measuring device can be reduced.

However, with the aid of the accelerometer, the angle measuring device can also be switched over between a machine use and a handheld use. The fixed location of the angle measuring device, which is unchanged on the upper tool, is easily differentiable from use in the case of manual guiding by means of the acceleration sensor. The handling is simplified and the risk of incorrect operation is reduced with the automatic switching over.

So as not have to perform any additional measures for fastening the angle measuring device on the bending machine, the device housing can have a permanent magnet in its rear wall for fastening on the upper tool, which not only provides advantageous installation conditions, but rather is also accompanied by the option of simple readjustment of the angle measuring device with respect to the vertex axis of the bending angle and the measuring gap.

If the signal processing unit has a radio interface, any cables are thus dispensed with, to be able to read out data of the angle measuring device and specify it to the machine controller, for example, or to be able to access the angle measuring device in a controlling manner from the outside. In this context, it probably does not have to be especially emphasized that batteries or rechargeable batteries suggest themselves for the power supply, to avoid cable terminals.

If the signal processing unit signals overshooting or undershooting programmable tolerance limits of the angles to be measured, it is thus advantageously possible to intervene in the bending procedure to ensure tolerance limits are maintained.

To improve the measured value accuracy, in particular during the raising movement of the upper tool, measured values can be stored in the memory unit, so that these measured values can be analyzed according to mathematical methods by the signal processing unit to increase the measured value accuracy. In particular reverberation procedures can thus be detected and the associated measured values can be eliminated. Furthermore, the analysis of a plurality of measured values enables a plausibility check of the measurement result and a judgment of the quality and/or the reliability of the displayed measured value.

A comparatively simple structure of the angle measuring device is achieved in that the sensor element has a rotating mirror for deflecting a laser beam onto the two legs of the sheet and forms a measured value from the reflected beam received in the emission direction. For this purpose, the angle measuring device has a laser emitter for a laser beam, a continuously revolving mirror, which is arranged between the two legs of the sheet, and is axially-parallel to the vertex axis of the bending angle, having an emission direction perpendicular to the rotational axis for the laser beam, a receiver for the laser beam reflected in the emission direction on the legs, and a signal processing unit connected to the receiver. The laser beam, which is deflected perpendicularly to the rotational axis of the mirror onto the legs of the sheet, passes in this case through a measuring gap of the upper tool. This is not only accompanied by simple design conditions, but rather also makes the measurement independent of the location of the angle measuring device on the upper tool.

BRIEF DESCRIPTION OF THE DRAWING

The subject matter of the invention is illustrated by way of example in the drawings. In the figures FIG. 1 shows a bending machine having a digital angle measuring device according to the invention in a partially cutaway, schematic side view FIG. 2 shows this bending machine in a schematic vertical section.

DESCRIPTION OF THE PREFERRED EMBODIMENT

Figure 3:
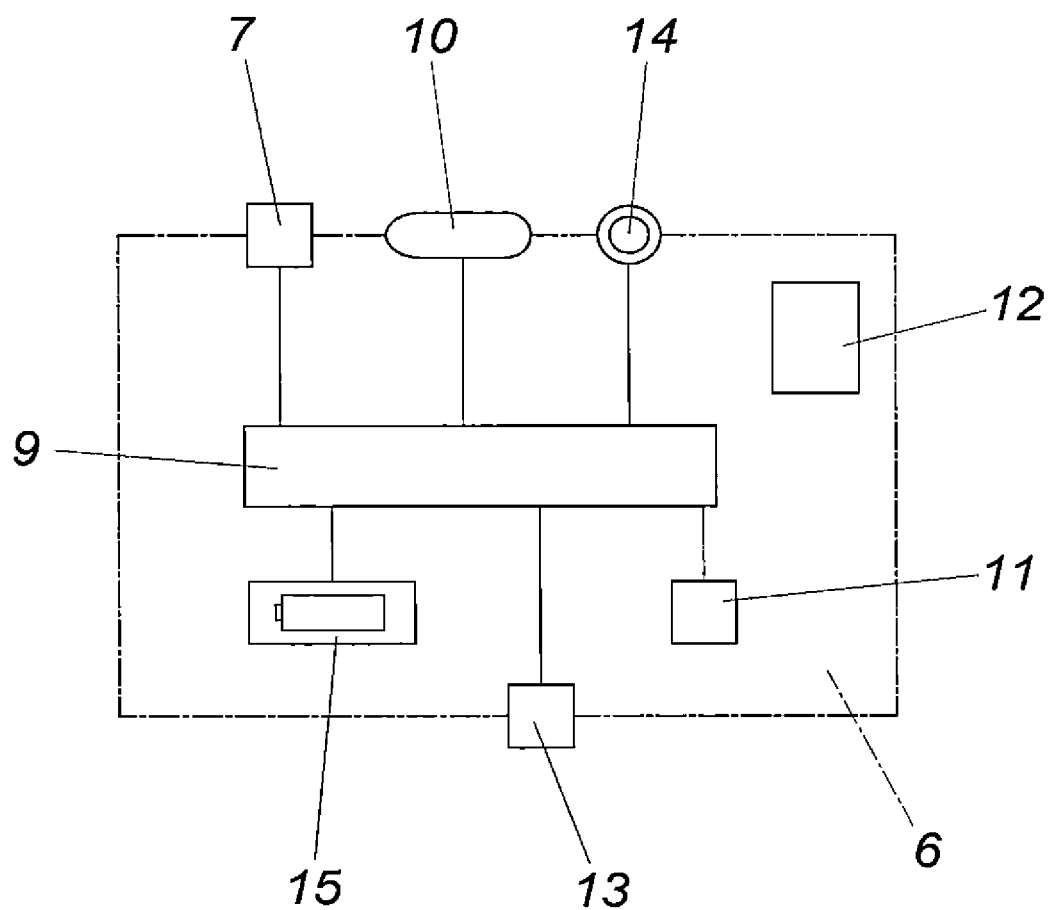
FIG. 3 shows the electronic angle measuring device according to the invention in a simplified block diagram.

The illustrated bending machine has an upper tool 1, which can be lowered and raised, and which interacts with a lower tool 2 in the form of a matrix and is assembled from stamp segments 3 arranged next to one another. A digital angle measuring device 6, which comprises a sensor element 7 having a mirror, which is rotated about a rotational axis parallel to the vertex axis of the bending angle between the two legs 4 of the sheet and deflects a laser beam in a plane perpendicular to the vertex axis onto the two legs 4, is fastened onto the upper tool 1 for measuring the bending angle between the legs 4 of a sheet 5 to be bent. The laser beam passes in this case through a measuring gap 8 between two stamp segments 3. Since the sensor element 7 has a receiver for the laser beam reflected in the emission direction on the legs 4 and the intensity of the reflected laser beam is greatest when the laser beam is perpendicular to the legs 4, the rotational position of the mirror can be specified for the laser beams which are perpendicular to the legs 4 of the sheet 5, as indicated in FIG. 2. Therefore, the respective bending angle between the two legs 4 may be derived from these rotational positions of the mirror.

For this purpose, according to FIG. 3, the sensor element 7 is connected to a signal processing unit 9, which analyzes the measurement signals received from the sensor element 7 and outputs the measured bending angle at a display 10. This display 10 is required not only for the use of the angle measuring device as a handheld device, but rather also enables the bending angle and other displayed data to be read off during use as a machine encoder, without having to turn away the view decisively from the sheet 5, which is anyway located in the field of vision.

Since the angle measuring device 6 has a motion sensor 11 connected to the signal processing unit 9, the angle measurement can be synchronized with the motion of the upper tool 1 via the detection of the motion of the upper tool 1, without having to make use of the machine controller. The electronic angle measuring device 6 can therefore be used without complex refitting work in existing bending machines if a measuring access of the sensor element 7 to the two legs 4 of the sheet 5 is possible, which can be ensured in a simple manner in the case of the typical assembly of the upper tool 1 from stamp segments 3. The angle measuring device 6 is solely to be fastened accordingly on the upper tool 1. For this purpose, providing at least one permanent magnet 12 in the region of the housing rear wall of the angle measuring device 6 suggests itself.

If the motion sensor 11 is designed as a multi-axis accelerometer, by means of its signals for the acceleration of gravity, the angle measuring device 6 can be aligned in a simple manner in relation to the horizontal vertex axis of the bending angle between the two legs 4, which is predefined by the matrix and the stamp segments 3. In addition, it is possible to analyze a measurement signal corrected with respect to the acceleration of gravity, so that exclusively accelerations of the angle measuring device 6 can be used for ascertaining the motion of the upper tool 1.

Storing measured values during the raising movement of the upper tool 1 is particularly advantageous for the formation of accurate measurement results. By way of measurements also during the rebound of the sheet 5 after the bending procedure, reverberation procedures can be eliminated by the signal processing unit 9 with the aid of suitable mathematical methods and the final result can be improved. The measuring procedure is preferably ended by a microprocessor, which computes an end of the bending procedure on the basis of an analysis of the measured value family. Alternatively, ending the measuring procedure after passage of a fixed time span or after traveling a certain distance of the upper tool ascertained from the signal of the motion sensor is also possible.

If the angle measuring device 6 has a radio interface 13, data can thus not only be transmitted wirelessly from the angle measuring device 6 outward, but rather also data can be transmitted from the outside to the angle measuring device 6. To be able to set different operating modes for the angle measuring device 6, the angle measuring device can additionally be provided with an input 14. To be freed of cable terminals, the angle measuring device 6 is preferably to be equipped with batteries or rechargeable batteries 15 for the power supply.

The invention claimed is:

1. An electronic angle measuring device for a bending machine for measuring bending angle between, said device comprising:

a sensor element that supplies angle-equivalent signals in a contactless manner to a signal processing unit, which has a microprocessor and a memory unit and is connected to a digital display, wherein the sensor element, the signal processing unit, and the display form said angle measuring device, which is fastenable on an upper tool of the bending machine and is configured to be used as a handheld encoder, and which has a motion sensor that is connected to the signal processing unit and detects a lowering and/or raising movement of the upper tool so as to trigger a measuring procedure.

2. The electronic angle measuring device according to claim 1, wherein the motion sensor is configured as a multi-axis accelerometer.

3. The electronic angle measuring device according to claim 2, wherein the signal processing unit corrects a signal of the accelerometer by a signal component based on the acceleration of gravity.

4. The electronic angle measuring device according to claim 1, wherein the device has a housing that has at least one permanent magnet in a rear wall thereof adapted to fasten on the upper tool.

5. The electronic angle measuring device according to claim 1, wherein the signal processing unit has a radio interface.

6. The electronic angle measuring device according to claim 1, wherein the signal processing unit signals overshooting or undershooting of programmable tolerance limits of an angle to be measured.

7. The electronic angle measuring device according to claim 1, wherein the signal processing unit analyzes measured values, which are stored in the memory unit during the lowering and raising movement of the upper tool, according to mathematical methods to increase accuracy of the measured values.

* * * * *

UNITED STATES PATENT AND TRADEMARK OFFICE
CERTIFICATE OF CORRECTION

PATENT NO. : 10,365,091 B2
APPLICATION NO. : 15/577732
DATED : July 30, 2019
INVENTOR(S) : Johann Wögerbauer and Andreas Wögerbauer Page 1 of 1

It is certified that error appears in the above-identified patent and that said Letters Patent is hereby corrected as shown below:

In the Specification

Column 5, Line 39, after "for" insert -- a --, and after "between" insert -- legs of a sheet --.

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*